Sept. 21, 1943.   H. GRASSHOF   2,329,714
PRODUCTION OF LUBRICATING OILS
Filed Feb. 18, 1939
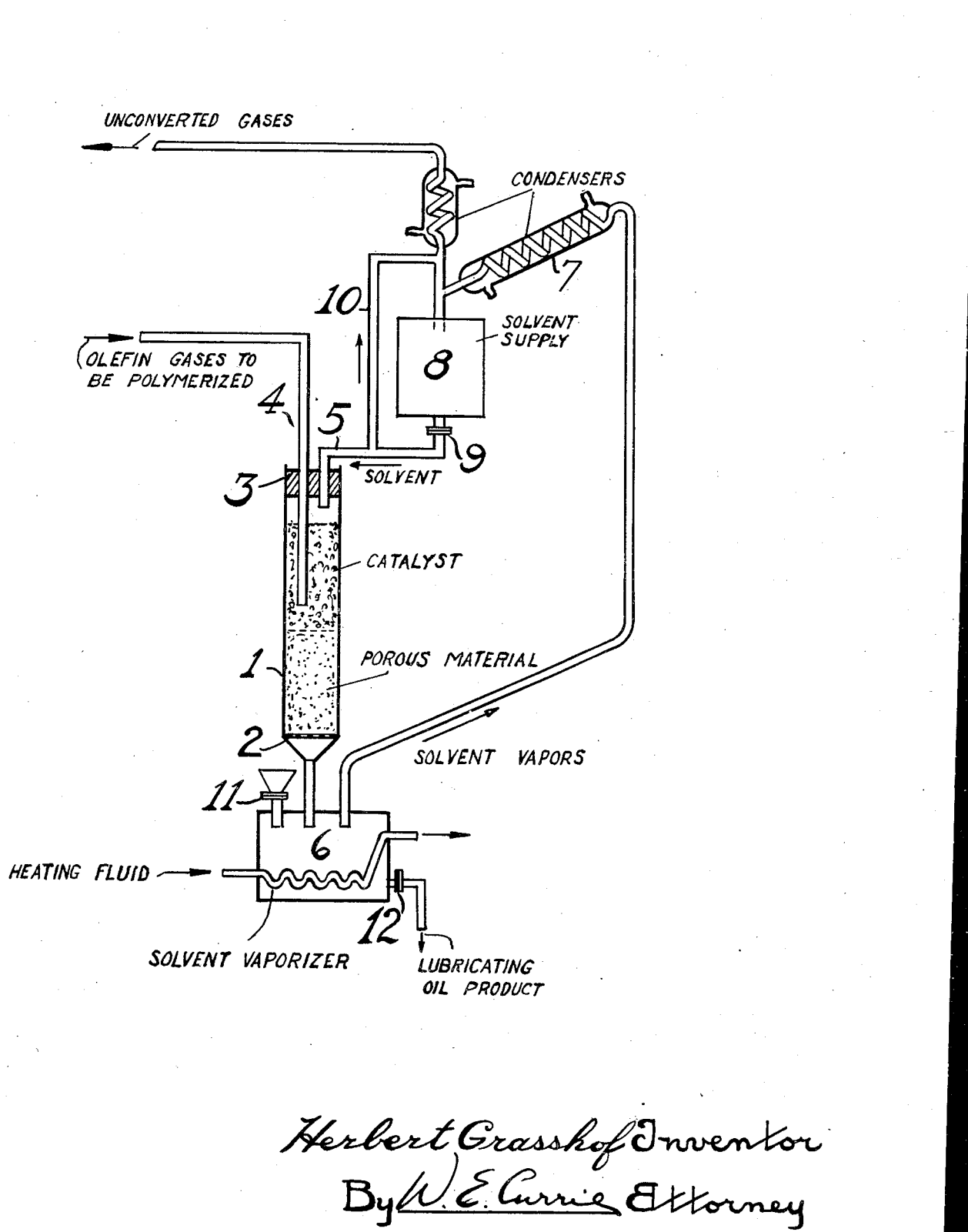

Patented Sept. 21, 1943

2,329,714

UNITED STATES PATENT OFFICE 2,329,714

PRODUCTION OF LUBRICATING OILS

Herbert Grasshof, Mannheim, Germany; vested in the Alien Property Custodian

Application February 18, 1939, Serial No. 257,084
In Germany February 23, 1938

8 Claims. (Cl. 196—10)

The present invention relates to the production of lubricating oils by the polymerization of olefines.

It is already known to polymerize olefines with the acid of anhydrous metal halides having a polymerizing action, as for example aluminum chloride or aluminum bromide. Such polymerizations have been carried out already in the presence of solvents which dissolve the polymerization products deposited on the catalysts and hence add appreciably to the activity and the life of the catalyst. One method of proceeding may be for example to suspend aluminum chloride in the solvent and then to introduce the olefines. Among suitable solvents may be mentioned inert solvents, as for example benzines, hydrocarbons containing halogen or cyclohexane, or also such as take part in the reaction, as for example cracked paraffin waxes, unsaturated middle oils or aromatic compounds. Depending on the nature of the olefine and the solvent the polymerization products are obtained in the form of oils of varying degrees of polymerization, for instance as benzines, middle oils, lubricating oils or high-molecular weight resins.

When working with the same catalyst and the same solvent, the degree of polymerization of the resulting products is primarily dependent on the temperature employed; an increase of the temperature results in a lowering of the degree of polymerization, whereas a polymerization at a low temperature and in the presence of inert solvents, as benzine, of certain olefines, as for example propylene or α-butylene, yields highly viscous, thickly liquid syrups which by cracking can be further transformed into benzines, middle oils and lubricating oils. When working at higher temperatures, however, lubricating oils may directly be obtained. The following table exhibits the viscosities of some products obtained by introducing propylene into a suspension of aluminum chloride in benzine at different temperatures and after distilling off the benzine and the first runnings up to a temperature of 140° C. at an absolute pressure of 7 millimeters (mercury gauge):

| Polymerization temperature | Viscosity at 38° C. | Viscosity at 99° C. | Viscosity index |
|---|---|---|---|
| | °E. | °E. | |
| 10° C | 377.7 | 9.84 | 73 |
| 40° C | 39.6 | 2.45 | 36 |
| 50° C | 8.75 | 1.55 | 36 |
| 60-70° C | 5.79 | 1.40 | 16 |

At the higher temperatures of the range indicated, the aluminum chloride reveals already its splitting effect resulting in a degradation of part of the polymerization products formed to products of a lower molecular weight. There are thus obtained products of low viscosity index on the one hand, and a relatively large proportion of first runnings, i. e. a comparatively poor output of the desired oil on the other hand. For the preparation of products with a definite viscosity, the maintenance of a definite temperature must be strictly observed which makes large-scale manufacturing fairly difficult owing to the heat of reaction evolved.

I have now found that olefines which are gaseous at the reaction temperature may, in the presence of an inert solvent, be converted into lubricating oils of a good viscosity index and otherwise good properties by providing for the reaction product being only for a short time in contact with the metal halide serving as the catalyst. For this purpose the olefine is passed over the solid catalyst, such as for example aluminum chloride, while a solvent is being led thereover in a continuous stream. By the said method of operating the lubricating oil formed is withdrawn from the action of the catalyst forthwith and the reaction heat evolved is simultaneously led away in part in a simple manner by the steady supply of cold solvent, so that any temperature within the range coming into consideration, i. e. from about 0° to about 100° C., preferably from 30° to 80° C., may be maintained in the reaction vessel by controlling the temperature and the speed of flow of the solvent in an appropriate manner. The process may be rendered continuous by distilling off the solvent from the lubricating oil continuously and returning it to the reaction vessel.

The process is adapted for the treatment of all olefines which are gaseous under the reaction conditions, in particular those containing at least 3 carbon atoms in the molecule, such as for example propylene, α-butylene or the amylenes. It can be carried out under ordinary or increased pressure, increased pressure being necessary, as a rule, with ethylene.

The solid catalyst must generally be employed in fairly large quantities lest the throughput should be too small. It is therefore not advantageous, as a rule, to use it on carriers. As the catalyst, for example aluminum chloride, gradually loses its solid form during the reaction owing to the syrupy addition compounds formed, it is preferable to distribute it in layers in porous materials, such as for example diatomite or pumice, which are capable of retaining the syrupy substances. It may also be deposited on filter plates.

The process according to the present invention may be carried out with advantage in an apparatus diagrammatically illustrated by way of example in the accompanying drawing, it being understood that any other suitable apparatus may be used.

A vertical tube 1 of 12 centimeters in diameter and 4 liters in capacity, having a tapered lower end and a sieve 2 mounted inside, is charged with 1 to 2 liters of granular diatomite (size of grain about 10 millimeters). Superimposed thereon are alternate layers of finely powdered aluminum chloride and of diatomite. Through the closure 3 at the top of the reaction tube 1, two tubes 4 and 5 are introduced, of which tube 4 carrying the gas to be polymerized reaches down to about the middle of the aluminum chloride-diatomite layer, while tube 5, serving for the supply of solvent, only protrudes little into the reaction tube through the closure. The reaction tube at its lower end communicates with a heated container 6 holding from 2 to 3 liters, into which flows the mixture of the lubricating oil formed and the solvent. In this container the solvent is continuously distilled off from the lubricating oil and then passes through a cooler 7 into a second tainer 8 of 1 liter capacity, which is situated above the top level of the reaction tube and communicates with the latter through tube 5 extending to below the closure. At the lower end of the container 8 tube 5 is provided with a cock 9 which allows to control the speed of flow of the solvent as desired. Furthermore, tube 5 is provided with a vertically branched-off tube 10 for the exhaust of non-converted gases. To avoid waste of solvent, the pressure prevailing within container 8 is balanced from outside by a communication with the open air, which is preferably established through one of the coolers. The container 6 is provided with 2 cocks, the upper one of which 11 serves for resupplying fresh solvent, while the lower one 12 serves to pass the crude lubricating oil to vacuum distillation. The temperature in the container 6 is such that the solvent only just distills over into the container 8. If the distillation of the crude lubricating oil withdrawn through cock 12, instead of in vacuo, be carried out under normal pressure, the operation can be rendered completely continuous by converting the container 6 into a separator in which a temperature is maintained up to which the first runnings are to be distilled from the lubricating oil. The vapors of the readily volatile constituents escape at the top of the separator, while the lubricating oil is withdrawn at the bottom.

At a reaction temperature of from 40° to 60° C., the output of lubricating oil usually ranges between about 60 and 70 per cent, with reference to the olefine used. The viscosity of the oils obtained is, generally speaking, between about 15° and about 25° E. at 38° C., and the average molecular weight ranges between 400 and 500. The oils which are good lubricating oils for use in motor-car engines, are remarkable for a low pour-point and a very low coke test as well as for their complete combustion in use; they also show no tendency towards asphalt-formation.

The following example which is given in connection with the accompanying drawing above explained serves to further illustrate how the present invention can be carried out in practice, but the invention is not limited to this example.

*Example*

30 liters per hour of propylene are led into an apparatus as described, at between 45° and 55° C. under atmospheric pressure. Benzine (boiling between 65° and 95° C.) is used as a solvent and led in a rate of 2.4 liters per hour. The reaction tube is charged with 350 grams of aluminum chloride distributed in layers in 1 liter of diatomite. From the resulting lubricating oil containing benzine, the benzine and first runnings are distilled off in vacuo under a pressure of 7 millimeters up to a temperature of 140° C. The remaining product has a red-brown color with marked green fluorescence. After filtering it through bleaching earth while still hot, a lubricating oil of a light yellow color and with the following characteristics is obtained:

| | |
|---|---|
| Viscosity at 38° C _____°E__ | 20.79 |
| Viscosity at 99° C _____°E__ | 2.02 |
| Viscosity index _____ | 58 |
| Specific weight at 20° C _____ | 0.844 |
| Pour point _____°C__ | −35 |
| Flash point _____°C__ | 173 |
| Acid number _____ | 0.03 |
| Coke test (Conradson) _____ | 0.02 |
| Asphalt content (British Air Ministry test) _____ | 0.0 |

The yield of lubricating oil amounts to 665 grams after 20 hours, which comes up to 60 per cent of propylene used. When used in an engine of the Hanomag type, the consumption of oil which has a temperature of 90° C. at the entrance is 3.5 grams for each h. c. per hour, measured after 25 hours' permanent running. The oil leaves no combustion residue.

By varying the speed of flow of the benzine and hence the temperature of the reaction vessel, oils having the following characteristics are obtained:

| | Temperature | |
|---|---|---|
| | 40–50° C. | 55–65° C. |
| | °E. | °E. |
| Viscosity at 38° C _____ | 22.97 | 14.85 |
| Viscosity at 99° C _____ | 2.18 | 1.83 |
| Viscosity index _____ | 73 | 62 |

If less first runnings be distilled off from the crude lubricating oil, oils with even higher viscosity indices but a lower flash point are obtained.

A gas which contains 60 per cent of olefines, namely propylene and, in addition, mainly butylene, and 40 per cent of saturated hydrocarbons, mainly propane and butane, yields when treated under identical conditions, a spindle oil of the following characteristics:

| | |
|---|---|
| Viscosity at 38° C _____°E__ | 5.03 |
| Viscosity at 99° C _____°E__ | 1.39 |
| Viscosity index _____ | 43 |
| Pour point _____°C__ | −45 |

What I claim is:

1. The process of producing lubricating oils which comprises passing, at a polymerizing temperature between 0° C. and 100° C., an olefine which is gaseous under the reaction conditions and a liquid solvent for the oil formed over a stationary solid metal halide having a polymerizing action and withdrawing a solution of lubricating oil in said solvent from contact with said metal halide.

2. The process as claimed in claim 1, in which the metal halide is aluminum chloride.

3. The process as claimed in claim 1, in which the metal halide is aluminum chloride and is arranged in a solid porous material.

4. The process as claimed in claim 1, in which the polymerizing temperature is between 30° and 80° C.

5. The process as claimed in claim 1, in which the temperature and amount of the solvent are so controlled that the polymerizing temperature is between 0° and 100° C.

6. The process as claimed in claim 1, in which the temperature and amount of the solvent are so controlled that the polymerizing temperature is between 30° and 80° C.

7. The process as claimed in claim 1, in which the olefine is propylene.

8. The process as claimed in claim 1, in which the olefine is propylene, the metal halide is aluminum chloride and is arranged in a solid porous material and the temperature and amount of the solvent are so controlled that the polymerizing temperature is between 30° and 80° C.

HERBERT GRASSHOF.